United States Patent

Kondo

[15] 3,680,762

[45] Aug. 1, 1972

[54] AUTOMATIC SOLDERING APPARATUS

[72] Inventor: Kenshi Kondo, 6-3, Tamagawa-Setamachi Setagaya-ku, Tokyo, Japan

[22] Filed: June 2, 1970

[21] Appl. No.: 42,843

[30] Foreign Application Priority Data

June 28, 1969 Japan..........................44/60699

[52] U.S. Cl. .......................228/37, 29/503, 29/626, 118/74, 228/36
[51] Int. Cl. ..............................................B23k 1/08
[58] Field of Search ........228/34, 35, 36, 37; 118/74; 29/503, 626; 113/116

[56] References Cited

UNITED STATES PATENTS 2,764,953  10/1956  Mullan..............................113/59
2,770,875  11/1956  Zimmerman....................29/503
2,776,640  1/1957   Miklofsky et al................118/74
3,163,146  12/1964  Hagner et al. ..................113/126
3,482,755  12/1969  Raciti ..............................228/34
3,574,934  4/1971   DeRose ..........................29/626

FOREIGN PATENTS OR APPLICATIONS 628,778  10/1961  Canada...........................228/37

Primary Examiner—John F. Campbell
Assistant Examiner—R. J. Craig
Attorney—Walter Spruegel

[57] ABSTRACT

A flux foaming unit, a preheating unit, a solder bath unit, and a cooling unit are arranged around an endless chain moving in a horizontal plane. By mounting a printed circuit board on a carrier attached to the endless chain, the board can be transported by means of the carrier and soldered automatically during its passage over each said unit.

3 Claims, 14 Drawing Figures

INVENTOR
*Kenshi Kondo*

BY

ATTORNEY

INVENTOR
Kenshi Kondo

BY
ATTORNEY

AUTOMATIC SOLDERING APPARATUS

This invention relates to an automatic soldering apparatus for soldering a printed circuit board assembled with electric parts while it is carried around in the apparatus.

In the automatic soldering of the printed board, it has been conventionally and generally attempted to arrange a flux foaming unit, a preheating unit, a soldering bath unit in a linear manner, pass a printed circuit board over the units in succession by an endless carrying means, and automatically solder the board. According to this system, however, the total effective distance of carriage of the endless carrying means cannot be fully utilized but only half of the entire length is used. Because of its linear arrangement the endless carrying means is much elongated in length, and this requires a larger space for installation relative to the whole apparatus. Also, in the linear arrangement, the printed circuit board must be attached to the carrier when the carrier appears at one end of the endless carrying means (the return path of the endless carrying means normally runs underneath a table). It is troublesome for the operator to find the carrier when suddenly appearing from beneath the table and instantly attach the printed circuit board to the carrier. Said board is automatically disengaged from the carrier at the other end of the endless carrying means and the carrier only returns to said one end over the return path under the table. During the carrier return, the solder deposits and flux on the carrier will drop and accumulate on the bottom plate of the table support. The space between this bottom plate and the carrier return path is usually relatively small so that the accumulated solder deposits will at times interfere with the endless carrying means.

A main object of the present invention is to overcome such disadvantages, utilize the entire length of the carrying means effectively for the operation, and thereby achieve economy and closer proximity to associated processes by smaller space for installation.

According to the invention, an automatic soldering apparatus comprises endless carrying means revolving in a horizontal plane, a plurality of carriers each for supporting a plate member to be soldered, with the carriers being removably attached to the endless carrying means and circulating therewith in the horizontal plane, and arrangement of a flux foaming unit, a preheating unit, a solder bath unit, and a cooling unit disposed in that order in a circle under a carrier track.

In this automatic soldering apparatus, a printed circuit board is automatically soldered while it makes one round in a horizontal plane on a carrier driven by the endless carrying means. Thus, nearly the entire length of the carrying means is effectively used for carrying out the process required for soldering. As each carrier can always be seen by the operator, the loading of the carriers with boards is quite easy for him, and as the carriers circulate in the horizontal plane the solder deposits will not accumulate on the bottom plate of the table support as heretofore. The endless carrying means may preferably consist of an endless chain.

Another object of the invention is to provide a lead wire cutting unit following the cooling unit. Thus, the soldering process and the cutting of the lead wire of the soldered printed circuit board are carried out in a single operation for increased productivity.

Another object of the invention is to provide an automatic soldering apparatus which is provided with two series of the aforementioned units around the endless carrying means, thus carrying out the soldering operation in two steps. This system is specifically adapted for printed circuit boards having relatively long lead wires.

Still another object of the invention is to improve the aforementioned units.

The invention will be further explained, and other objects and features will become apparent, from the following description, with reference to the accompanying drawings, in which.

Figure 1:
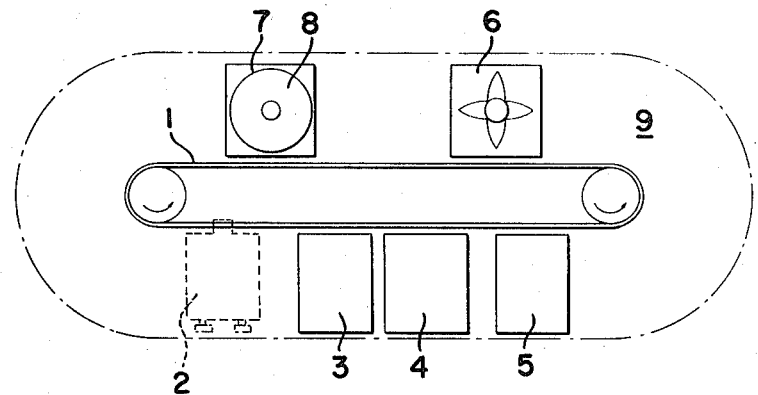
FIG. 1 is a schematic diagram showing the construction of an automatic soldering apparatus according to the invention.

Referring now to FIG. 1, an endless chain 1 is provided at the center of the automatic soldering apparatus to revolve in a horizontal plane, to which carriers 2 for printed circuit boards (not shown) are attached. Beneath the track on which the carriers 2 move there are disposed a flux foaming unit 3, a preheating unit 4, a solder bath unit 5, a cooling unit 6, and a lead wire cutting unit 7, in that order.

In the apparatus shown, each carrier 2 circulates along a rail (not shown) on the upper surface of the frame 9 of the apparatus, with the carrier moving with the endless chain 1. Accordingly, each printed circuit board to be soldered, when mounted on a carrier 2 and transported thereby, is coated with foamed flux at the unit 3, preheated at the unit 4, dipped in and soldered by the molten solder at the unit 5, cooled at the unit 6, with the downwardly extending length of the lead wire cut off by the cutter 8 of the unit 7, thereby concluding a soldering process.

After being soldered, the printed circuit board is released from the carrier 2 by a device not shown, with only the carrier being returned to the initial position. In this position, another printed circuit board to be soldered is placed on the carrier 2, thus repeating the cycle of operation.

Figure 2:
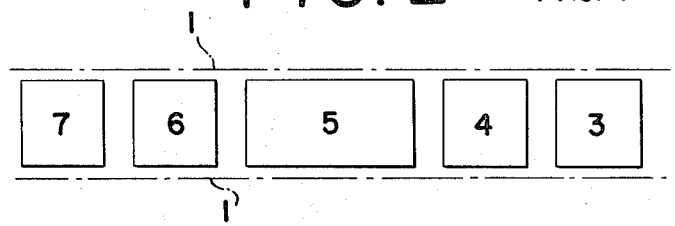
FIG. 2 is a schematic diagram showing the construction of a known automatic soldering apparatus.

FIG. 2 shows a known soldering apparatus in which identical parts are denoted by identical numerals for each unit as in FIG. 1. In the apparatus shown, the units are provided in a linear arrangement as already mentioned. Since the endless chain returns through a lower passage (not shown), the effective carrying length of the endless chain is merely one half of the entire length of the chain.

As may be apparent from comparison with the known apparatus of FIG. 2, the soldering apparatus according to the invention will effectively utilize the entire length of the chain, and the various units are arranged within a minimum space, whereby the whole apparatus will be of small size. The apparatus of the invention incorporates a lead wire cutting unit, so that the lead wire can be cut following the soldering process, thereby enhancing the efficiency of the production and adapt the apparatus for mass production.

Figure 3:
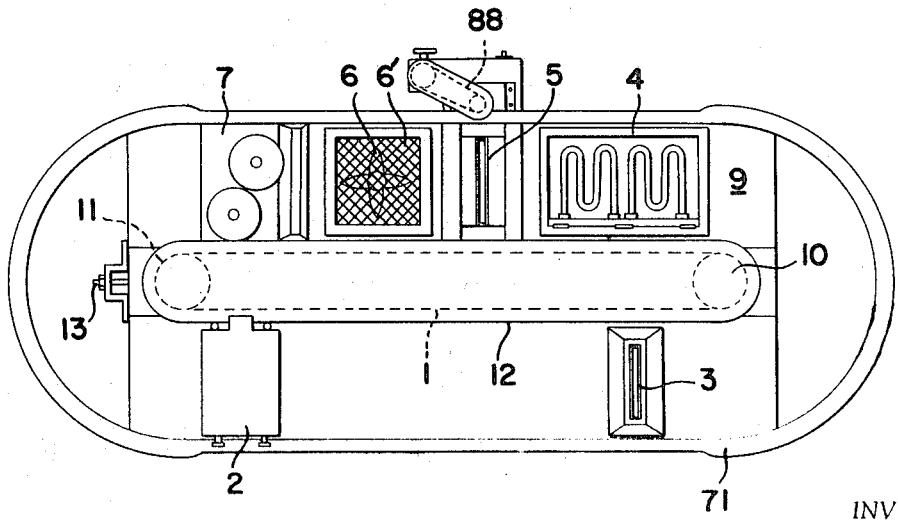
FIG. 3 is a plan view of a preferred embodiment of an automatic soldering apparatus according to the invention.
Figure 4:
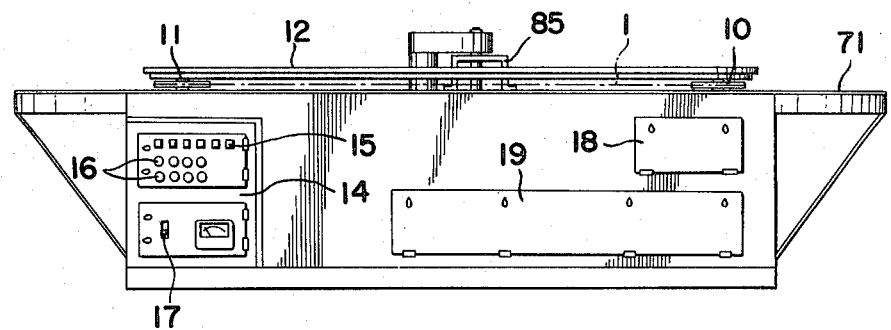
FIG. 4 is a side elevation of the apparatus of FIG. 3.

FIGS. 3 and 4 show a preferred embodiment of the invention. The endless chain 1 is mounted on sprockets 10 and 11 driven by a motor not shown. A safety cover 12 is provided over the chain 1. The sprocket 10 may be fixed on the frame 9 and the sprocket 11 can be adjusted at 13 for regulating the tension in the chain 1. The endless chain 1 is provided with a number of carriers 2 for printed circuit boards at substantially equal intervals along its length. Underneath the track of the carriers are arranged, in that order, a flux foaming unit 3, a preheating unit 4, a solder bath unit 5, a cooling unit 6, and a lead wire cutting unit 7, with these units surrounding the endless chain 1. A control box of an electrical system of the apparatus is designated at 14, including different pilot lamps at 15, switches at 16, a main power switch at 17, and inspection cover plates at 18 and 19.

Figure 5:
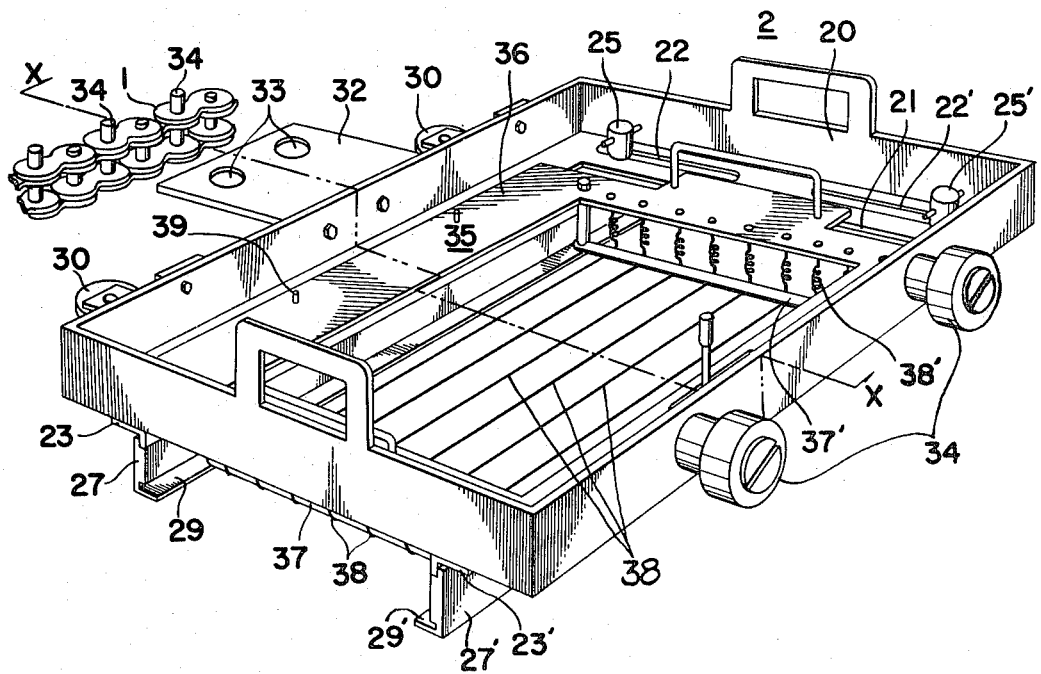
FIG. 5 is a perspective view of a carrier adapted to be used in the soldering apparatus.
Figure 6:
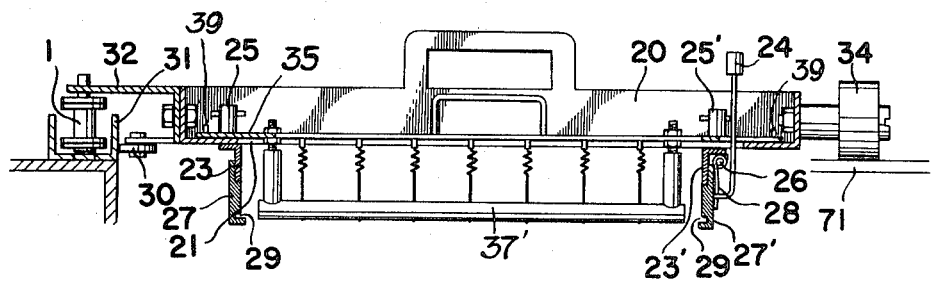
FIG. 6 is a sectional view taken along the line X—X of FIG. 5.

Referring to FIGS. 5 and 6, each carrier 2 has a frame 20 of substantially rectangular box-shape, the bottom surface of said frame having a rectangular opening 21. At the fore and rear parts of the bottom surface of the carrier are formed elongated slots 22 and 22' respectively. Screw studs (not shown) at both ends of each of a pair of mounting bars or angles 23 and 23' are inserted into said elongated grooves 22 and 22', with said screw studs threadedly receiving fasteners 25 and 25' to rigidly secure the angles to the frame. The spacing between the angles 23 and 23' can be adjusted by loosening the fasteners 25 and 25' to relatively move the angles. The angle 23 carries a support member or plate 27, and to the other angle 23' is hinged, at 26, a support member or plate 27' with plate 27' is normally biased clockwise by the spring 28 (FIG. 6). The lower ends of the support plates 27 and 27' are provided with a longitudinally extending groove and projections, and the portions consisting of the grooves and the projections 29 and 29' form gripping elements for the opposite edges of a printed circuit board when the board is inserted between said portions against the biasing force of the spring 28. The support plate 27' has an operating handle 24 secured thereto, with this handle passing through the opening 21 and projecting upwardly in the frame 20. When a cam member (not shown) at a chosen location along the track of the carriers 2 contacts the upper end of the operating rod 24, the support plate 27' is swung counter-clockwise, resulting in release of a gripped circuit board and it will drop.

Fixed to one side of the frame 20 is a plate member 32 having two holes 33 which receive two projecting link pins 34 provided on the endless chain 1, whereby the carrier is removably attached to the endless chain. Also, a pair of rollers 30 on the same side of the frame 20 ride on guide rails 31 to prevent cocking of the carrier (FIG. 6). The carrier 2 has on the other side a pair of wheels 34 rotatable on the rails 71 at the upper surface of the frame 9.

There is removably mounted an auxiliary carrier 35 on the frame 20. The auxiliary carrier 35 has a frame-like flat plate 36 with an opening in the middle, a pair of guide rods 37 and 37' parallel to one pair of opposite edges of said opening in, and spaced downwardly from, the plate 36, with a large number of thin wires 38 being strung between said guide rods and parallel to each other. The flat plate 36 has on each of two opposite sides two holes which receive studs 39 in the bottom of the frame 20 to locate the auxiliary carrier 35 on the frame 20. The thin wires 38 are at one end fixed to one side of the flat plate 36, and are at the other end secured to the other side of the flat plate 36 through spring 38' which tension the wires. A printed circuit board can be carried by the auxiliary carrier 35 simply by placing the board on the wires 38.

Figure 7:
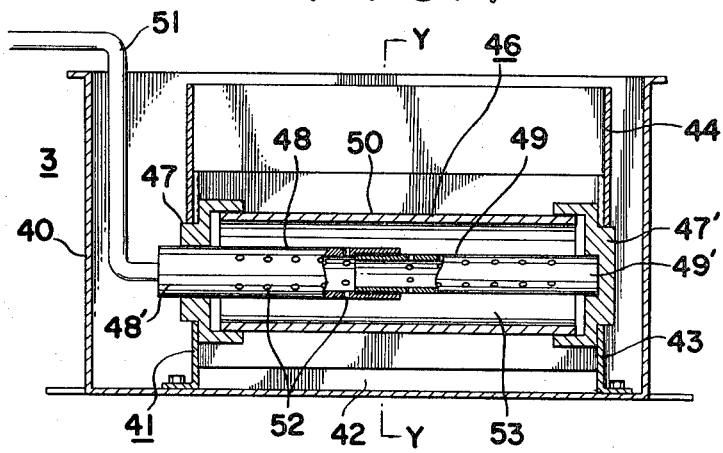
FIG. 7 is a view showing a cross section of the construction of a flux foaming unit.
Figure 8:
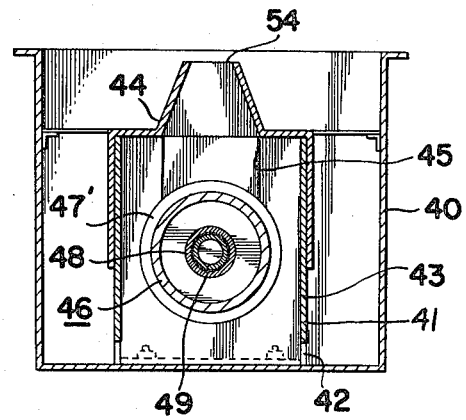
FIG. 8 is a sectional view taken along the line Y—Y of FIG. 7.

Particulars of the flux foaming unit 3 of FIG. 3 are illustrated in FIGS. 7 and 8. The foaming unit has an outer vessel 40 and an inner vessel 41, the latter vessel 41 providing a vessel proper 43 having an opening 42 communicating with the outer vessel, and a cap member 44 fitted to the vessel proper 43 and having a rectangular nozzle 54 at the top. Two opposite sides of the vessel proper 43 are provided with slots 45 through which to insert from above two end caps of a foamer 46. The foamer 46 consists of a pair of end caps 47 and 47', a cylindrical foaming tube 50 fitted between said end caps, and air ducts 48 and 49 mounted within the foaming tube concentrically therewith. One end 49' of the air duct 49 is fixed in the central hole of the end cap 47', with the other end thereof being threaded into the adjacent end of the air duct 48. The other end 48' of the air duct 48 is connected to the air pipe 51, and is closely fitted in the central hole of the end cap 47. The inner periphery of the end cap 47 has a sliding fit with the outer periphery of the foaming tube 50, so that on rotating the air duct 48 relative to the air duct 49 to thereby screw the latter into the former, the end cap 47 may be moved towards the end cap 47'. Thus the foaming tube 50 can be fitted between end caps and the length of the foamer 46 can be adjusted.

The foaming tube 50 consists of a sintered alloy, having great mechanical strength and a great many fine pores. The air ducts 48 and 49 have many openings 52 along their peripheries. The liquid flux is injected into the vessel until it immerses at least the upper surface of the foaming tube 50. Accordingly, when compressed air passes from the air pipe 51 into the air ducts 48 and 49, it passes through the openings 52 to the interior 53 of the foaming tube 50, thence passes through fine pores in the wall of the foaming tube into the liquid flux to foam the same. The foamed flux overflows at the nozzle 54 of the cap member 44 and reaches, and is thus applied to, a passing printed circuit board. A large number of holes 52 in the air ducts serves to equalize the air pressure in the space 53 between the boaming tube 50 and the air ducts 48 and 49 so that flux with small air bubbles will flow uniformly from the nozzle 54 throughout its length.

Figure 9:
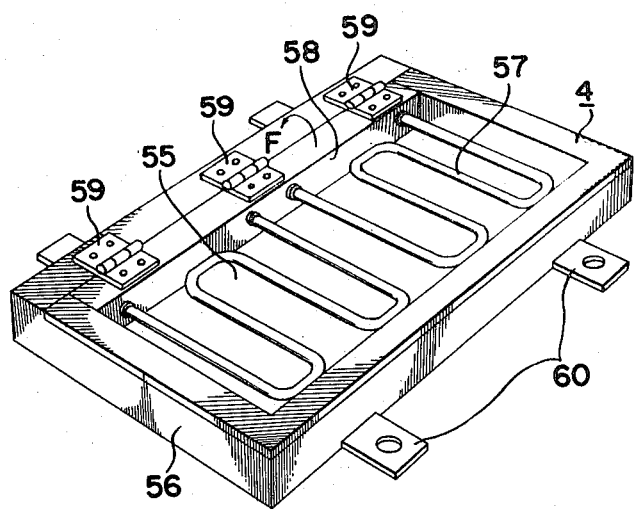
FIG. 9 is a perspective view of a preheating unit.

Details of the preheating unit 4 of FIG. 3 are shown in FIG. 9. The unit 4 includes a casing 56 having a reflector plate 55 in the interior thereof. A mounting bar 58 to which a sheathed heater 57 is attached is secured to one side of the casing 56 by means of a plurality of hinges 59. Therefore, the heater 57 and the mounting bar 58 can be turned in the direction of the arrow F, and thus the heater 57 can be retracted from the shown operative position in the casing 56 for the purpose of accumulated flux which drops into the casing 56. The casing has projecting mounting lugs 60. The heater 57 serves for preheating the circuit boards, resulting in reduction of heat sinking on parts of the printed circuit boards or on the surfaces of the boards and in activating the flux.

Figure 10:
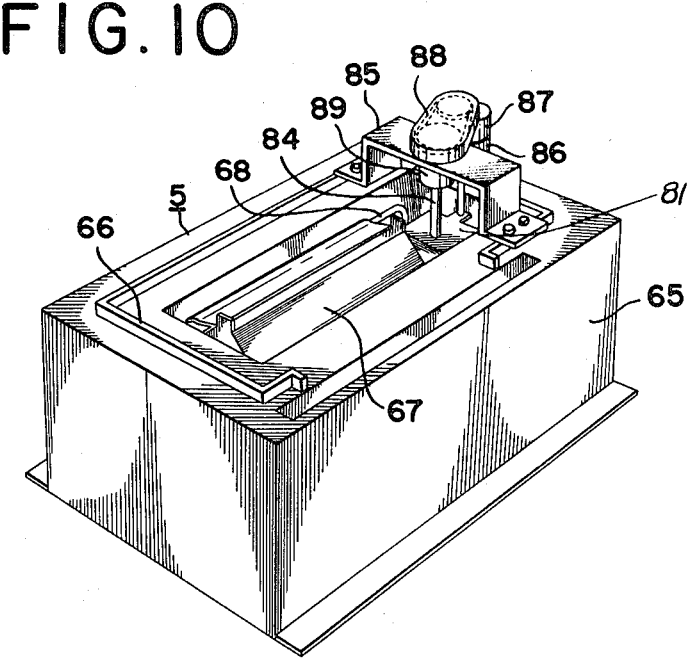
FIG. 10 is a perspective view of a solder bath unit.
Figure 11:
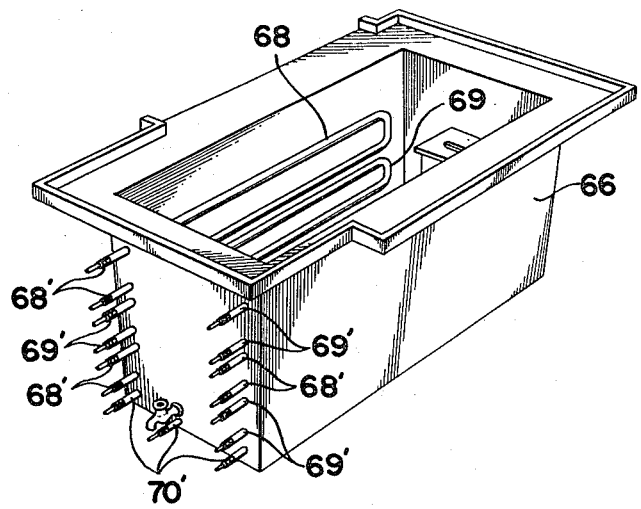
FIG. 11 is a perspective view of a solder pot.
Figure 12:
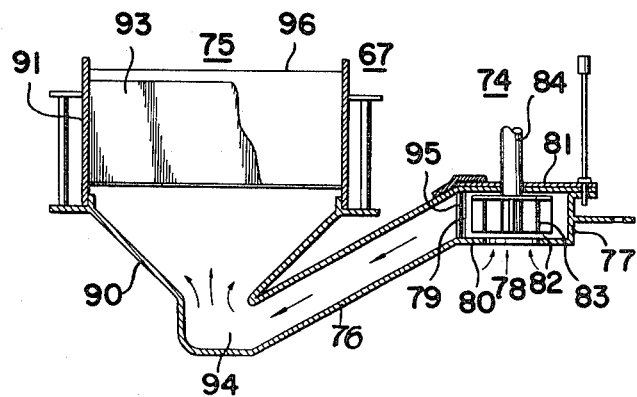
FIG. 12 is a sectional view showing the construction of the jet bath.

Particulars of the solder bath unit 5 of FIG. 3 are illustrated in FIGS. 10 to 12. Referring to FIG. 10, the unit 5 includes an outer casing 65, a solder pot 66 inserted in the casing, and a jet bath 67 inserted in said solder pot. As best shown in FIG. 11, there are arranged on the side walls of the solder pot a sheathed heater 68 for solder melting and a sheathed heater 69 for controlling the temperature of the molten solder, with each of these heaters consisting of three heater elements connected in delta. At the bottom of the solder pot 66 is provided another sheathed heater 70 (not shown) for use if needed. Each heater 68 to 70 has terminals 68' to 70', respectively. Connected in series with the heater 68 is a thermostat (not shown). When the solder in the pot is heated to a temperature at which it melts, the thermostat will stop the flow of current through the heater 68. The temperature of the molten solder is maintained constant by a temperature control means having a platinum resistor (not shown) and on-off control for current flow through the heater 69.

Figure 13:
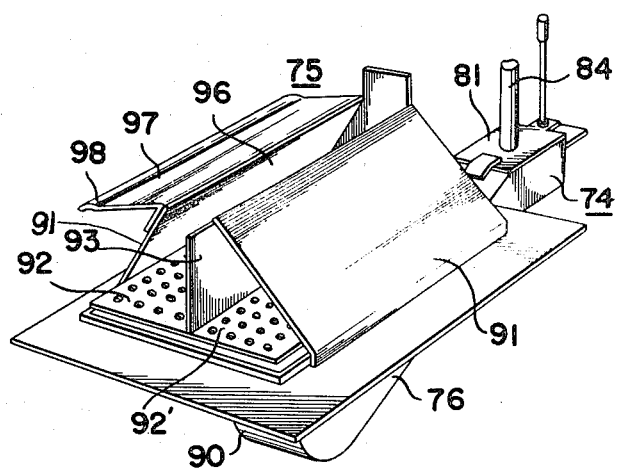
FIG. 13 is a perspective view, partly broken away, of the jet bath of FIG. 12.

The jet bath 67 comprises, as seen in FIGS. 12 and 13, a solder suction portion 74, a nozzle portion 75, and a conduit portion 76 connecting both portions. The suction portion 74 has side walls provided with a solder discharge opening 79, a bottom plate 80 with a solder suction opening 78, and a cover plate 81. In the space 82 within by members 77, 80, and 81 is arranged a pump wheel 83. The shaft 84 of the pump wheel 83 extends upwardly through an opening in the cover plate 81 and is held in a bearing 89 on a bridging plate 85 (FIG. 10), and this shaft is driven by a motor 86 on the casing 65 through speed changing means 87 and a belt drive 88.

The nozzle portion 75 has a lower part 90 flaring funnel-like upwardly from the solder inlet 94 at the bottom, an upper part 91 mounted on said lower part and flaring upwardly in inverted-funnel fashion (FIG. 13) a turbulence flow control plate 92 mounted in the vicinity of the junction of the upper and the lower parts and having a number of holes 92', and a rectification plate 93 vertically extending in the middle of the upper part. The solder inlet 94 communicates with the suction portion 74 through the inclined conduit portion 76.

As the pump wheel 83 is driven by the motor 86, the molten solder flows from the pot 66 into the space 82 through the suction opening 78 and is passed to the conduit portion 76 by a flow control plate 95. The molten solder then flows downwardly in the conduit 76 to the solder inlet 94 and then rises in the funnel-shaped lower port. The molten solder, which is powerfully stirred by the pump wheel 83 and hence is in violent turbulence, becomes increasingly less turbulent on its flow through the downwardly inclined conduit portion 76 and the lower part 90 of expanding funnel shape. The solder flow is further moderated by turbulence flow control plate 92 and flow direction control plate 93. Thus, the solder flow subsides to a mild solder flow wave of remarkably uniform height over the length of the nozzle 96, and spurts from the nozzle 96. When a printed circuit board passes the solder flow wave, the latter contacts the lower surface of the board which thus becomes soldered. The lead wires project downwardly from the lower surface of the board, so that the level of the solder wave must be higher than the length of the projecting lead wires in order to reach the board. The height of the wave can readily be adjusted by the speed changer 87.

While soldering of printed circuit boards is carried out, it sometimes occurs that solder icicles or bridges form on the soldered surface of a board. These solder icicles or bridges can be removed by a solder conducting plate 97. This plate 97 consists of a single board member which with its bent edge is secured to the nozzle 96, and is inclined downwardly away therefrom. The conducting plate is at its opposite edge formed as an upwardly curved lip portion 98. The molten solder spurts from the nozzle 96 and is then divided to left and right, with the molten solder flowing over the conducting plate 97 being raised again by the raised lip portion 98, resulting in a small wave of molten solder thereat. Since the conducting plate extends from the side of the nozzle 96 leading in the travel direction of the printed circuit boards, the solder icicles or bridges can be completely removed by this second solder wave.

Reverting now to FIG. 1, the cooling unit 6 consists of a known air blower having a motor and a fan, with the front of the blower being provided with a protection screen 6' (FIG. 3). A printed circuit board soldered in the manner described hereinbefore is rapidly cooled on passing the cooling unit 6. By such cooling, the mechanical strength of the adhered solder can be ensured, as well as surface brightness improved. Furthermore, a printed circuit board deformed in being heated in the soldering procedure, can be reformed by the cooling.

Figure 14:
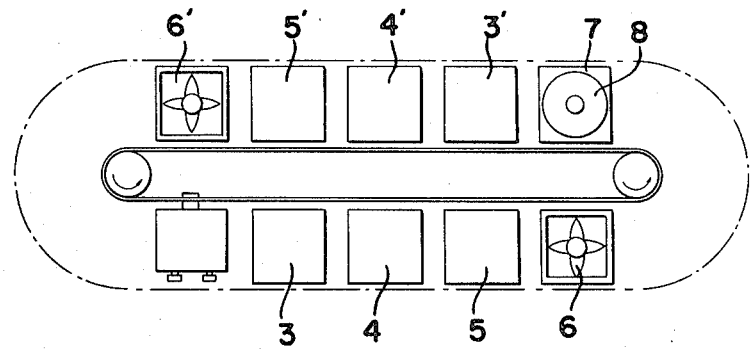
FIG. 14 is a schematic diagram showing another embodiment of the invention.

In case the lead wires projecting from printed circuit boards are relatively long, the molten solder wave spurting from the nozzle 96 must be at a correspondingly high level to reach the boards. As the level of the solder wave increases, however, it becomes difficult to keep the wave level uniform over the length of the nozzle 96. In that case, it is preferred to perform the soldering operation in two steps. FIG. 14 shows an apparatus for performing the soldering in such two steps, in which additional units 3' to 6', which are identical with units 3 to 6 in FIG. 1, are arranged, in that order, following the unit 7 (FIG. 14). In operation, the wave of the molten solder at the solder bath unit 5 is set to a high level in accord with the length of the projecting lead wires, whereas the wave of molten solder at the solder bath unit 5' is set to a relatively low level. The initial soldering can be carried out in the above described manner by the units 3 to 6. In the unit 7, the elongated projecting lead wires are cut off. In this initial soldering procedure the solder wave will be set for such a high level that accurate soldering of the details of a printed circuit will not be achieved, for there often remain unsoldered portions. Therefore, the second soldering procedure is preferably carried out by the units 3' to 6'. Since the projecting lead wires have been cut off already by the unit 7, the level of the molten solder wave in the unit 5 can be set lower, whereby a solder wave at a uniform level throughout can be obtained. Thus, accurate soldering can be effected, and solder bridges and other failures produced in the initial soldering can also be fully removed.

What is claimed is:

1. Automatic soldering apparatus, comprising endless carrying means moving in a given direction in a circuitous path in a horizontal plane; a plurality of carriers for removably carrying printed circuit boards with lead wires depending from one face, with said carriers being connected with said endless carrying means for movement therewith; track means supporting said carriers for movement in said horizontal plane and with said one face of circuit boards carried thereby being horizontally disposed and facing downwardly; a first series of successive flux-foaming, preheating, and solder bath units beneath said carriers, and being in flux-applying, preheating, and solder-applying relation, respectively, with said one face of circuit boards on passing carriers, of which said solder bath and flux-foaming units are leading and trailing, respectively, in said given direction, and said solder bath unit having a nozzle and a continuous solder wave issuing therefrom and overflowing thereat, with said nozzle being spaced from said one face of circuit boards on passing carriers to clear depending lead wires thereon, and said overflowing solder wave having a sufficiently high crest to contact said one face of circuit boards on passing carriers; a lead wire cutting unit beneath said carriers and spaced from said solder bath unit in said given direction, and being in lead-cutting relation with circuit boards on passing carriers; another series of second successive flux-foaming, preheating and solder bath units beneath said carriers, and being in flux-applying, preheating and solder-applying relation, respectively with said one face of circuit boards on passing carriers, with said other series of units being spaced from said lead wire cutting unit, and said second solder bath and flux-foaming units being leading and trailing in said given direction, and said second solder bath unit being identical with that of said first series, except that said nozzle of said second solder bath is closer to said one face of circuit boards on passing carriers.

2. Automatic soldering apparatus as in claim 1, wherein each of said flux-foaming units provides an outer vessel, an inner vessel in communication with said outer vessel and having a top nozzle below said one face of circuit boards on passing carriers, with said vessels holding a supply of flux liquid, a foamer immersed in flux liquid in said inner vessel, said foamer having a porous foaming tube, a pair of end caps supporting said foaming tube in said inner vessel, two air ducts extending in said foaming tube, the outer ends of said air ducts being closely fitted into said end caps, respectively, and the other ends thereof being threadedly connected, and an air pipe connected to one of said air ducts, with said air ducts having a large number of holes throughout their peripheries to equalize the air pressure in the space between the foaming tube and the air ducts therein and thereby bring about uniform flux foaming from the whole outer periphery of the foaming tube.

3. Automatic soldering apparatus as in claim 1, wherein each of said preheating units provides a casing, a sheathed heater, and a mounting bar carrying said heater, with said bar being hinged to said casing, whereby said heater is turnable from its operative position in said casing to the out-side of the casing.

* * * * *